United States Patent [19]

Fleck et al.

[11] Patent Number: 4,654,730
[45] Date of Patent: Mar. 31, 1987

[54] TAPE CASSETTE APPARATUS WITH HELICAL SPRING CASSETTE HOLDER DRIVE

[75] Inventors: Harald Fleck, Schwechat; Heinrich Hütter, Tulln; Heimo Jäger, Wiener Neudorf, all of Austria

[73] Assignee: U.S. Philips Corporation, New York, N.Y.

[21] Appl. No.: 849,607

[22] Filed: Apr. 8, 1986

[30] Foreign Application Priority Data

Apr. 10, 1985 [AT] Austria .................................. 1084/85

[51] Int. Cl.⁴ .............................................. G11B 15/66
[52] U.S. Cl. ...................................... 360/96.5; 360/95
[58] Field of Search ............................ 360/96.5, 93, 95

[56] References Cited

U.S. PATENT DOCUMENTS 3,395,871 8/1968 Ackermann et al. ............ 242/55.13

4,361,859 11/1982 Schatteman ...................... 360/96.5

*Primary Examiner*—Stuart N. Hecker
*Assistant Examiner*—Alyssa H. Bowler
*Attorney, Agent, or Firm*—David R. Treacy

[57] ABSTRACT

A cassette holder is moveable between a first and a second end position, and has at least one actuating spring moving it from the first to the second position. The spring is a cylindrical helical spring wound around a shaft rotatably mounted on the cassette holder, and having at least one pinion meshing with a rack having the same shape as the path of movement of the cassette holder between the two positions. The spring is pretensioned, and the holder is latched in the first end position against the spring force. Upon release of the latch, the spring drives the shaft and pinion so that movement of the pinion along the rack moves the cassette holder from the first end position to the second end position.

6 Claims, 6 Drawing Figures

TAPE CASSETTE APPARATUS WITH HELICAL SPRING CASSETTE HOLDER DRIVE

BACKGROUND OF THE INVENTION

The invention relates to a recording and/or reproducing apparatus for a record carrier arranged in a cassette, comprising a cassette holder which comprises at least one main wall and two side walls and which is guided so as to be movable between a first end position and a second end position in a direction parallel to its side walls along a path of movement which extends at least partly transversely of its main wall, one end position being a loading position, in which a cassette whose main walls extend parallel to the main wall of the cassette holder can be inserted into the cassette holder and in which a main wall of an inserted cassette is positioned against the main wall of the holder, and the other end position being an operating position, at least one actuating spring acting on said holder to move it from the first end position to the second end position and to urge it against at least one stop in the second end position, which holder can be latched in the first end position against the force of the actuating spring by means of a disengageable latching device.

Such an apparatus is disclosed in German Auslegeschrift No. 12 07 653 to which U.S. Pat. No. 3,395,871 corresponds. In this known apparatus the cassette holder is channel-shaped and comprises two main walls interconnected by two side walls. By means of two actuating springs this cassette holder is movable between a loading position corresponding to said first end position and an operating position corresponding to said second end position along a path of movement parallel to its side walls and perpendicular to its main walls, said springs being two tension springs which extend perpendicularly to the main walls of the cassette holder and which are attached to the cassette holder and to the chassis. The tension springs are relatively short in order to minimize the space occupied in a direction perpendicular to the main walls of the cassette holder and hence the height of the apparatus, which means that they have a comparatively steep spring characteristic so that the forces exerted on the cassette holder in the tensioned and the relaxed condition of the actuating springs, i.e. in the loading position and the operating position, respectively, differ considerably. When the cassette holder is moved from its operating position to its loading position the forces exerted by the actuating springs, which then increase considerably, must be overcome, which requires a substantial effort and is therefore inconvenient if the cassette holder is manually set to its loading position as in the known apparatus.

SUMMARY OF THE INVENTION

In order to minimize the said difference in force it is also possible to use tension springs which are longer and hence have a flatter spring characteristic, but such long springs would occupy a substantial amount of space, leading to an undesirable increase in height of the apparatus.

It is the object of the invention to mitigate the above problems and to provide an apparatus in which the height of the apparatus is minimized in a simple manner and in which the difference in force exerted by at least one actuating spring on the cassette holder during its movement between its two, end positions is minimized.

In accordance with the invention, at least one shaft or spindle, which extends perpendicularly to the sidewalls of the cassette holder, is mounted for rotation on said holder and carries at least one pinion or gear wheel which meshes with a rack or toothed portion having the same shape as the path of movement of the cassette holder. The actuating spring is a cylindrical helical spring which is wound around the spindle with pretension, and acts on the cassette holder with one end and on the spindle with its other end. Afer the release of the latching device, the spring drives the spindle and the gear wheel on said spindle under the influence of its pretension, the gear wheel meshing with the toothed portions to move the cassette holder from the first end position into the second end position.

This arrangement is simple, and permits a compact construction and hence a small height of the apparatus. The spindle, which extends perpendicularly to the side walls and parallel to the main walls of the cassette holder, together the helical spring fitted around this spindle, and at least one gear wheel mounted on this spindle can be arranged on the cassette holder in such a way that no additional space is required in a direction perpendicular to the main walls of the cassette holder. Further, this ensures that when the cassette holder is moved against the pretension exerted by the helical spring only a comparatively small force is to be overcome, because the helical spring arranged on the spindle, has a large number of turns and is relatively long. The spring then has a flat spring characteristic and therefore has the advantage that the difference between the actuating forces exerted on the cassette holder by the helical spring when the cassette holder is in one end position, and in the other end position is small. If the movement against the pretension exerted by the helical spring is effected manually a convenient and smooth actuation of the cassette holder is achieved as a result of the small increase in force. If this actuation is effected by means of a motor this is possible with a low power consumption.

It is to be noted that it is possible to move the cassette holder from its loading position to its operating position with the pretensioned helical spring, as is known from the apparatus described in the aforementioned U.S. Pat. No. 3,395,871 and to effect the reverse movement manually or by means of a motor; and, conversely, to effect the movement of the cassette holder from its operating position to its loading position with the pretensioned helical spring and to effect the reverse movement manually or by means of a motor. An apparatus, in which the cassette holder is guided so as to be movable parallel to its side walls along a substantially L-shaped path of movement wich extends from its loading position in a direction substantially parallel to its main wall and subsequently transversely of its main wall into its operating position has the additional advantage that the actuating forces exerted on the cassette holder by the helical spring when the gear wheel cooperates with toothed portions on the cassette holder which have the same L-shape as the path of movement of the cassette holder always act almost entirely in the instantaneous direction of movement of the cassette holder which is moved in two mutually transverse directions, so that always a high efficiency is guaranteed regardless of the direction of movement. This advantage cannot be achieved by means of, for example, tension springs because these springs exert force components of different magnitude on the cassette holder when this holder is moved in different directions, resulting in a reduced efficiency.

It is to be noted that it is known, for example from DE-OS No. 32 38 510, to guide a cassette holder so that it is movable along an L-shaped path of movement, but the movement of this cassette holder from its loading position into its operating position and vice versa is effected by means of a motor via an actuating mechanism.

In this respect it is to be noted also that from German Offenlegungsschrift DE-OS No. 30 14 073 to which U.S. Pat. No. 4,361,859 corresponds, an apparatus is known in which the cassette holder is provided with a spindle which extends perpendicularly to the side walls of the holder and which carries two rotationally locked gear wheels which cooperate with toothed portions. The spindle is rotatably mounted on the cassette holder so as to be movable relative to this holder in a direction perpendicular to its longitudinal axis and can be driven in two directions of rotation by means of a motor. This spindle drives a device which is arranged on the cassette holder to insert a cassette into or remove it from this holder, the cassette holder in its turn being movable in two directions by means of a further motor. However, in the apparatus in accordance with the present invention the spindle is only rotatably mounted on the cassette holder and can be driven in one direction of rotation by a helical spring arranged on it to move the cassette holder in one directoon. In the other direction the cassette holder is moved by means of a motor, causing the spindle to be rotated in the other direction of rotation and the helical spring to be tensioned. Thus, the apparatus in accordance with the invention differs from the known apparatus both in respect of the manner in which the spindle is mounted on the cassette holder and the manner in which this spindle is driven and used. As already stated, the invention enables the power consumption of the motor by which the cassette holder is moved in one direction to be reduced by the provision of a helical spring which moves the cassette holder in one direction.

The spindle may, for example carry only one gear wheel which meshes with a tooth portion. However, it is found to be advantageous if near each side wall of the cassette holder the spindle, which is rotatably mounted on the cassette holder, has a gear wheel which meshes with a toothed portion having the same shape as the path of movement of the cassette holder. This ensures in a simple manner and without separate means, that the cassette holder cannot be canted during its movement.

When the cassette holder is mounted in the apparatus, the helical spring should be pretensioned by rotating the spindle before said at least one gear wheel is brought into mesh with the relevant toothed portion, which is possible by rotating the gear wheel manually or by means of a motor. After pretensioning of the spring the spindle should be blocked against rotation by the pretensioned spring as long as the gear wheel is not in mesh with the toothed portion, which can be effected by manually retaining the gear wheel. However, during further manipulation to assemble the cassette holder the gear wheel may be released inadvertently, as a result of which the spring is relaxed, and must be pretensioned again. Therefore, it is found to be advantageous if, in order to block the spindle against rotation by the pretensioned helical spring, the cassette holder is provided with a latch which is adapted to cooperate with a stop on the spindle and which is movable between a blocking position and a release position, the stop being urged against said latch by the pretension of the helical spring when the latch is in its blocking position and said latch being disengaged from the stop when the latch is in its release position. The latch is a reliable mounting aid which precludes an inadvertent rotation of the shaft by the pretensioned helical spring when said at least one gear wheel is not in mesh with the relevant toothed portion. When the gear wheel is in mesh with the toothed portion the latch is set from its blocking position to its release position, after which the latching retains the cassette holder in its first end position against the force of the helical spring which is now liberated. After said at least one gear wheel has been brought into mesh with the relevant toothed portion the latch may be set to its release position by hand or automatically.

The stop may comprise a radial projection on the shaft. Alternatively, the stop may comprise an eccentric pin on a gear wheel, which pin extends parallel to the spindle and is coupled to the spindle via the gear wheel. However, it is found to be advantageous if in its blocking position the latch engages in a tooth gap of said at least one gear wheel on the spindle and the stop comprises the tooth which adjoins said tooth gap of said at least one gear wheel and which is urged against the latch by the pretension of the helical spring. In this way a separate stop may be dispensed with.

An embodiment of the invention will now be described in more detail, by way of example, with reference to the accompanying drawings.

DESCRIPTION OF THE PREFERRED EMBODIMENT

Figure 1:
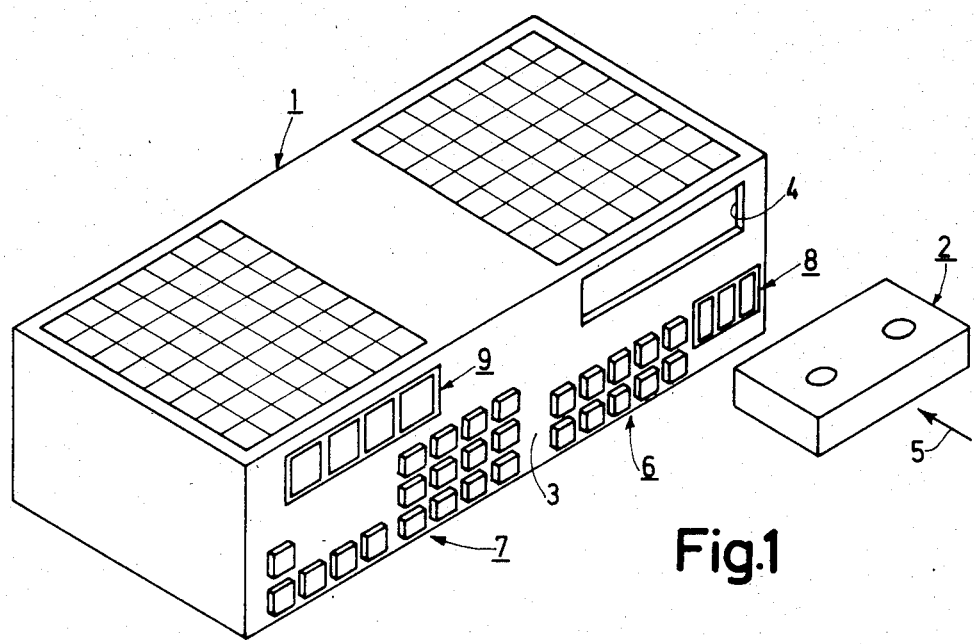
FIG. 1 is a perspective view of a front-loading recording and reproducing apparatus for video signals and audio signals.

FIG. 1 shows a recording and/or reproducing apparatus 1, which is intended for recording and reproducing video signals and audio signals on a magnetisable record carrier in the form of a tape, hereinafter referred to as magnetic tape. The magnetic tape is arranged in a rectangular cassette 2, shown schematically in FIG. 1, which cassette comprises two juxtaposed reel hubs between which the magnetic tape extends and which can be inserted manually into the apparatus 1 through an opening 4 in a front wall 3 of the housing of the apparatus in the direction indicated by the arrow 5.

When the cassette 2 is inserted into the apparatus it is slid into a movable cassette holder whose construction will be described in more detail hereinafter. After complete insertion of the cassette into the apparatus the cassette is lowered into an operating position, shown schematically in FIG. 2, by means of the cassette holder partly in a direction perpendicular to the cassette main walls. For starting the modes of operation of the apparatus such as "recording" normal forward reproduction", "normal reverse reproduction", "fast forward", "fast reverse", "still reproduction" etc. the apparatus 1 comprises a first set 6 of actuating buttons on the front wall 3. For preprogramming the apparatus and for entering further data, for example for setting a daytime clock, the apparatus 1 comprises a second set 7 of actuating buttons on the front wall 3. Further, the apparatus 1 comprises two display units 8 and 9 on the front wall 3, whose display elements each comprise, for example, seven segments and which serve, for example, for displaying the counter position of a counter for measuring the length of tape used and for displaying the time.

As stated, a cassette 2 which has been inserted into the apparatus is lowered in an operating position. As is shown schematically in FIG. 2, two winding spindles 14 and 15 then cooperate with the two juxtaposed rotatable reel hubs 10 and 11 between which the magnetic tape 12 extends inside the cassette 2 along a path which is partly represented by a dash-dot line 13 and onto which the magnetic tape is wound in opposite directions depending on its instantaneous direction of transport and as indicated by the arrows 10a and 11a, so that the two reel hubs 10 and 11 which are coaxially mounted on the winding spindles 14 and 15 can be rotated by means of the spindles. For driving the two winding spindles 14 and 15 there is provided a drive mechanism 16, shown schematically in FIG. 2, whose driven wheel 18, which can be motor-driven in opposite directions of rotation by a drive wheel 17 for selectively driving one of two turntables 19 and 20, which are coupled to the winding spindles 14 and 15, depending on its direction of rotation.

When the cassette 2 is lowered into its operating position a cassette cover, not shown, at the front 21 of the cassette is opened, thereby exposing a cassette opening in the front 21, and four tape guides 22, 23, 24 and 25 and a pressure roller 26, which are now in their rest positions indicated by the dash-dot lines, enter two recesses in the cassette 2 to engage behind the length of magnetic tape 12 represented by the dash-dot line 13. After the cassette has been lowered into its operating position the tape guides 22, 23, 24 and 25 can each be moved to their operating positions, shown in full lines in FIG. 2, whilst the pressure roller can be moved into an intermediate position, not shown in FIG. 2, in the direct proximity of a capstan 27. The magnetic tape is then withdrawn from the cassette 2 through the cassette opening in the front 21 of the cassette 2. From the intermediate position the pressure roller 26 can be moved into its operating position shown in FIG. 2, in which it presses the magnetic tape 12 against the capstan 27. Since the devices for opening the cassette cover, for moving the tape guides and the pressure roller and for pressing the pressure roller against the capstan are irrelevant to the present invention, they are not shown for the sake of simplicity. Such devices are generally known from existing apparatuses of the present kind.

Figure 2:
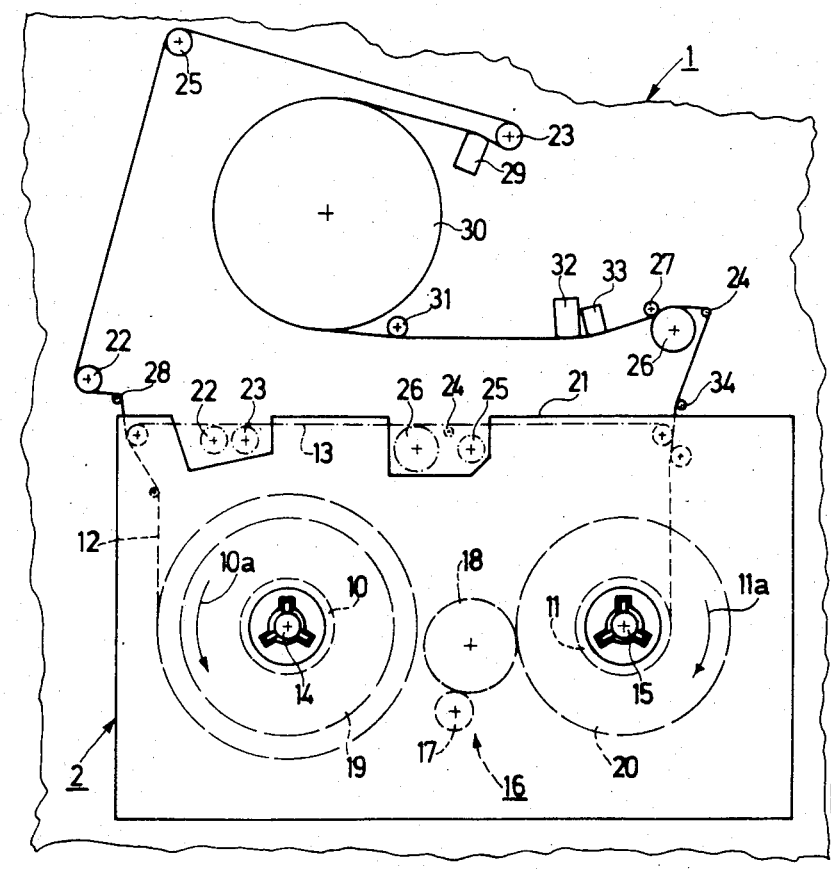
FIG. 2 is a schematic plan view of a part of the apparatus on a larger scale than in FIG. 1, the cassette being in its operating position in the apparatus and the record carrier being withdrawn from the cassette and wrapped around the guiding and scanning elements.

In the operating positions of the tape guides 22, 23, 24 and 25 and the pressure roller 26 the magnetic tape 12 extends along a path as indicated by a solid line in FIG. 2. The magnetic tape extends from the reel hub 10 to the reel hub 11 via two tape guides located in the cassette, a tape-tension sensor 28, the movable tape guides 22, 25 and 23, a stationary magnetic head 29 for erasing all the signals recorded on the magnetic tape, a drum-shaped scanning unit 30, the rotatable magnetic heads for recording and reproducing television signals in/from adjoining tracks which are inclined relative to the longitudinal direction of the magnetic tape, a stationary tape guide 31, a stationary magnetic head 32 for erasing audio signals in an audio track which extends in the longitudinal direction of the magnetic tape, a further stationary magnetic head 33 for recording and reproducing audio signals in the audio track and for recording and reproducing synchronizing signals in a synchronisation track which extends in the longitudinal direction of the magnetic tape and parallel to the audio track, the capstan 27, against which the magnetic tape 12 is pressed by the pressure roller 26, the movable tape guide 24, a stationary tape guide 34, and two further tape guides situated in the cassette. When the magnetic tape extends along the above path, the cassette holder being of course in its operating position, audio signals and video signals can be recorded or reproduced in known manner.

Figure 3:
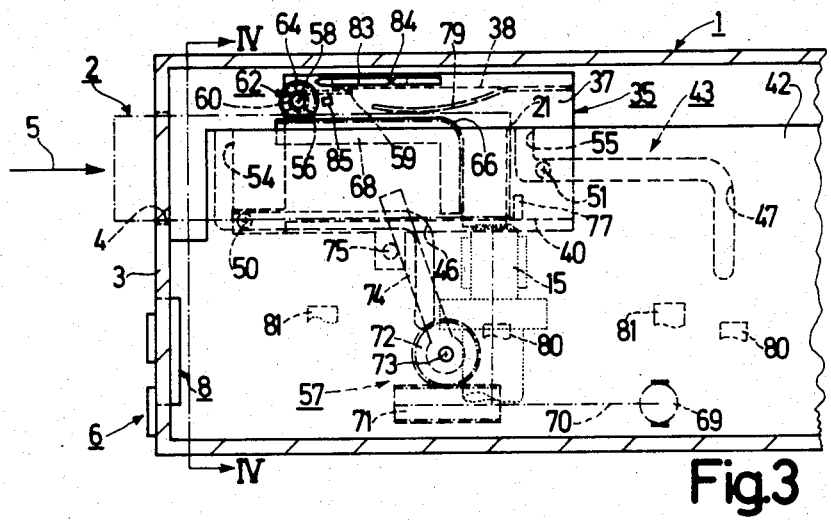
FIG. 3 is a side view on the same scale as in FIG. 2 showing a part of the apparatus with a cut-away side wall of the apparatus housing and with a cassette holder for a cassette in its loading position.
Figure 4:
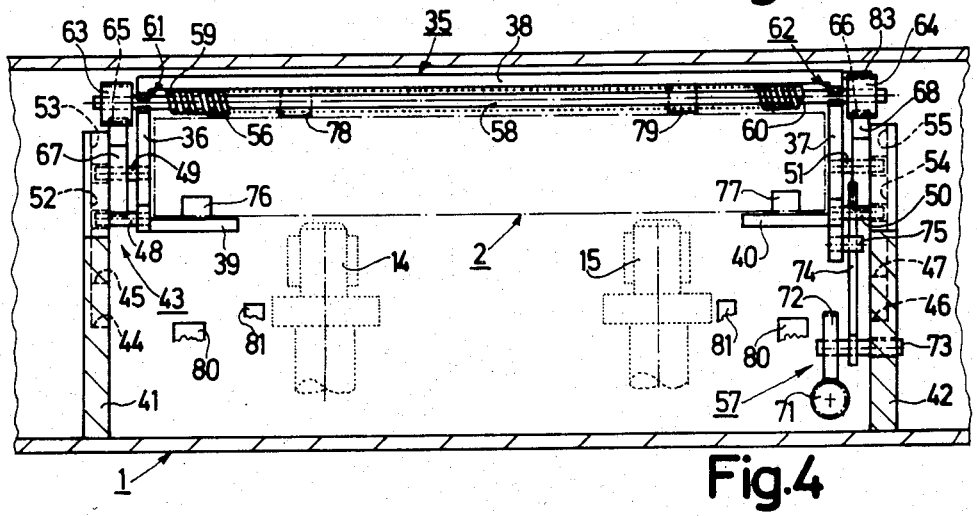
FIG. 4 is a sectional front view taken on the line IV—IV in FIG. 3 and showing a part of the apparatus comprising the cassette holder, which is also in its loading position.
Figure 5:
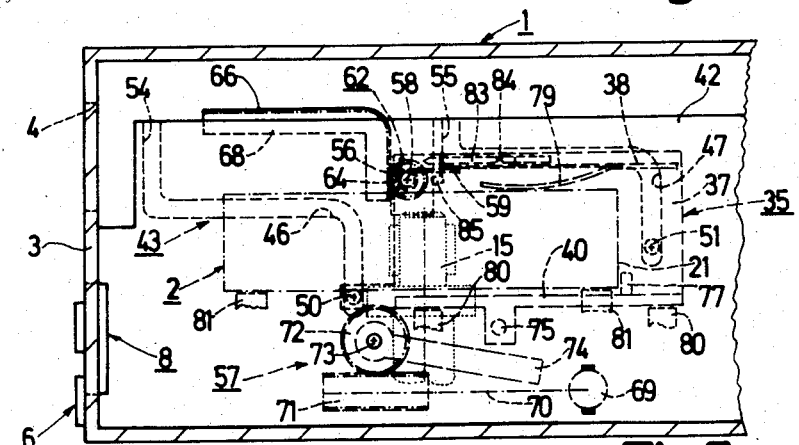
FIG. 5, in the same way as FIG. 3, shows the part of the apparatus comprising the cassette holder, which is in its operating position.

As already stated, the apparatus 1 comprises a movable cassette holder for moving a manually inserted cassette 2 to its operating position. As is shown in FIGS. 3 to 5, the cassette holder 35 is substantially channel-shaped and comprises two main walls and two side walls. The two side walls are 36 and 37. The main wall which is remote from the winding spindles 14 and 15 is the upper wall 38 interconnecting the two side walls 36 and 37. The lower main wall facing the winding spindles 14 and 15 comprises two bottom portions 39 and 40 which are inclined relative to the side walls 36 and 37 and which converge towards one another. The cassette holder 35 is made in one piece from a plastics. Obviously, the cassette holder may be constructed in different manner and may comprise for example a continuous lower wall formed with openings for the passage of the winding spindles and comprise two side walls which extend upwardly from the said lower wall, without an upper wall being provided.

The cassette holder 35 is guided so as to be movable between a first end position, which in the present example is the loading position shown in FIG. 3, and a second end position, which is the operating position shown in FIG. 5, in a direction parallel to its side walls 36 and 37 along a path of movement which extends at least partly transverse to its main walls 38 and 39, 40. The path of movement is L-shaped, the cassette holder being guided so as to be movable out of its loading position shown in FIG. 3 in a direction parallel to its main walls and subsequently perpendicularly to its main walls into the operating position shown in FIG. 5. For guiding the cassette holder 35 along this L-shaped path of movement a guide means 43 is arranged between the cassette holder and two stationary guide plates 41 and 42 in the apparatus, which plates extend parallel to the side walls 36 and 37. In each guide plate 41 and 42 the guide means 43 comprises two L-shaped guide slots 44, 45 and 46, 47 respectively defining the L-shaped path of movement. Further, the guide means 43 comprises two guide pins 48, 49 and 50, 51 on each side wall 36 and 37 respectively, the free ends of these pins engaging the guide slots 44, 45 and 46, 47 respectively. In order to facilitate insertion of the guide pins 48, 49, 50 and 51 on the cassette holder 35 into the guide slots 44, 45, 46 and 47 when the holder is mounted into the apparatus, the guide slots each comprise inclined portions 52, 53, 54 and 55 respectively at their ends facing the front wall 3, which portions extend up to the ends of the guide plates 41 and 42 and into whose open ends the guide pins can be inserted simply from the top during mounting of the cassette holder.

The cassette holder 35 cooperates with an actuating spring 56 for moving this holder from the loading position to the operating position and with a drive means 57, for moving the holder from the operating position to the loading position.

Figure 6:
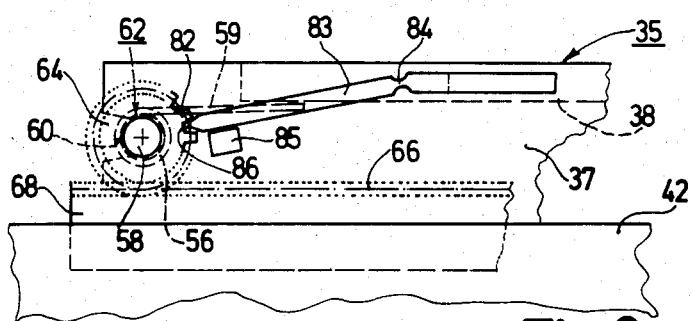
FIG. 6 shows a part of the cassette holder of the apparatus on a scale which is enlarged three times in comparison with FIG. 3.

The actuating spring 56 is a cylindrical helical spring which is arranged on a spindle 58 which extends perpendicularly to the side walls 36 and 37 of the cassette holder 35, the winding direction as is shown in FIGS. 3, 5 and 6 being anti-clockwise. The left-hand end 59 of the helical spring 56 in FIG. 4, which is offset from the spring turns transversely of the spindle 58, acts on the upper wall 38 of the cassette holder 35 and bears against this wall from the bottom. The right-hand end 60 of the helical spring 56 in FIG. 4 acts on the spindle 58 and is welded to the spindle 58. As is shown in FIG. 6, the spindle 58 snaps into bearing recesses 61 and 62 in the side walls 36 and 37 respectively, which recesses are partly open towards the front wall 3 and is thus rotatably supported in the cassette holder 35. Near the side walls 36 and 37 of the cassette holder 35 gear wheels 63 and 64 respectively are secured to the spindle 58. The gear wheels 63 and 64 each mesh with a toothed portion 65 and 66 respectively which have same L-shape as the path movement of the cassette holder 35 and which are provided on L-shaped members 67 and 68 respectively secured to the guide plates 41 and 42 respectively. The pretension of the hecical spring 56 tends to rotate the spindle 58 and the gear wheels 63 and 64 mounted on this spindle in a clockwise direction as shown in FIG. 3. As a result of this, the gear wheels 63 and 64 mesh with the teeth 65 and 66 and thereby move the cassette holder 35 from its loading position to its operating position. Meshing of the gear wheels with the toothed portions and the resulting movement of the cassette holder, however, is possible only after the release of a latching device which latches the cassette holder in the loading position against the force exerted by the helical spring, as will be described hereinafter.

The said drive means 57 comprises a reversible motor 69 which drives a worm 71 via a transmission 70, schematically represented by a dash-dot line, for example a reduction gear. The worm 71 drives a worm wheel 72 which is mounted on a journal 73. The journal 73 is rotatably mounted in the guide plate 42. Further, the journal 73 carries an actuating lever 74 which cooperate with an actuating pin 75 which projects from the sidewall 37. In this way the actuating lever 74 of the drive means 57 acts on the cassette holder 35 via the actuating pin 75. When the cassette holder is in its loading position the actuating pin 75 is urged against the actuating lever 74 under the influence of the helical spring 56 which, as already stated, tends to move the cassette holder out of its loading position, the latching lever 74 in its turn being retained via the self-locking worm gear 71, 72. Thus, in the present case the drive means 57 constitutes the aforementioned disengagable latching device which latches the cassette holder in its loading position against the force of the helical spring 56. Obviously, it is possible to use a separate disengagable latching device, for example a manually or electromagnetically actuated latch, to retain the cassette holder in its loading position.

If the cassette holder 35 is in its loading position shown in FIGS. 3 and 4 a cassette 2 whose main walls extend parallel to the upper wall 38 and bottom wall portions 39 and 40 of the cassette holder and whose short side walls extend parallel to the side walls 36 and 37 of the cassette holder, can be inserted manually into the cassette holder in the direction indicated by the arrow 5. Insertion is possible until the front side 21 of the cassette 2 butts against two abutments 76 and 77 which project from the bottom wall portions 39 and 40 towards the upper wall 38. From the top two metal blade springs 78 and 79, which are secured to the upper wall 38 by an adhesive or by ultrasonic welding, exert pressure on the inserted cassette 2, urging the inserted cassette with its lower main wall against the bottom wall porions 39 and 40 of the cassette holder in the loading position of this holder. This situation is shown in FIGS. 3 and 4, where the cassette 2 is represented by a dash-dot line for the sake of clarity.

After a cassette 2 has been inserted completely into the cassette holder 35 the motor 69 of the drive means 57 is started, causing the latching device constituted by the drive means to be released. This may be effected by sacutation of a button of the set of buttons 6 or automatically via a sensor switch such as a micro-switch or a light-barrier switch actuated by a completely inserted cassette. The direction of rotation of the motor 69 is obviously selected in such a way that it drives the actuating lever 74 clockwise viewed in FIG. 3. As a result of this, the actuating pin 75 and consequently the entire cassette holder 35 is released to be moved by the helical spring 56. The pretensioned spring 56 drives the spindle 58 and the two gear wheels 63 and 64 under the influence of its pretension in a clockwise direction viewed in FIG. 3, so that the gear wheels 63 and 64 mesh with the toothed portions 65 and 66 and thereby move the cassette holder 35, which is guided along the L-shaped path of movement, from its loading position shown in FIGS. 3 and 4 to its operating position shown in FIG. 5, causing the actuating pin 75 to bear against the actuating lever 74. This results in a uniform actuating movement for the cassette holder 35, which movement is defined by the actuating movement of the motor-driven actuating lever 74, the actuating force being provided by the helical spring 56. In the operating position of the cassette holder 35 the holder butts with its two bottom wall portions 39 and 40 against four stops 80 which define the operating position and the helical spring 56 urges the cassette holder against the stops 80. When the cassette holder 35 is maintained in the operating position the cassette 2, which is also in its operating position, is supported by four locating stops 81, the blade springs 78 and 79 ensuring that the cassette 2 is urged against the stops 81. Once the cassette holder has reached its operating position, in which it is held by the helical spring 56, the motor 79 is driven further for a short time, so that the actuating lever 74 is lefted off the actuating pin 75, as shown in FIG. 5. Subsequently, the motor 69 is switched off, for example by means of end switch, not shown, which is actuated by the actuating lever 74 in the end position of the lever shown in FIG. 5.

In order to return the cassette holder 35 from its operating position to its loading position the motor is driven in a direction opposite to that described above, for example by actuation of a further button of the set of buttons 6, so that the actuating lever is driven anti-clockwise viewed in FIG. 5 and moves the cassette holder by means of the actuating pin 75 into its loading position along the L-shaped path of movement against the force exerted by the helical spring 56. When the cassette holder has reached its loading position shown in FIG. 3 the motor 69 is switched off, for example by an end switch which is actuated by the actuating lever 74 in the end position of this lever shown in FIG. 3, or which is actuated by the cassette holder. Thus, the loading position of the cassette holder 35 is defined by the drive means 57, which acts as a latching device, via the actuating lever 74.

As can be seen in FIGS. 3 to 6 the spindle together with the helical spring around the spindle and the two gear wheels secured to this spindle occupies substantially no additional space, which leads to a compact construction and a minimal height of the apparatus, which is particularly desirable in the case of a front-loading apparatus as in the present example. As can be seen in particular in FIG. 4, a comparatively long helical spring with a large number of turns is arranged on the spindle, which spring suitably has a flat characteristic and therefore has the advantage that the difference between the forces exerted on the cassette holder in the loading position and in the operating position is minimal. This gives the advantage that when the cassette holder is moved from the operating position to the loading position against the force of the helical spring only a slightly higher force is to be overcome, so that this is possible by means of a motor with a comparatively low power consumption. Since the actuating forces provided by the helical spring act via the gear wheels which mesh with the toothed portions, the advantage is obtained that regardless of the direction of the actuating movement of the cassette holder which follows an L-shaped path the actuating forces always act in the instantaneous direction of this actuating movement, resulting in a high efficiency. By arranging gear wheels on the two ends of the spindle canting of the cassette holder during its movement is impossible because the gear wheels mesh with the toothed portions. Thus, in addition to the actuating function the gear wheels which are in mesh with the toothed portions also perform a guiding function for the cassette holder.

In the present apparatus it is found to be advantageous to who employ a helical spring comprising approximately 300 turns. In order to obtain a suitable pretension of this helical spring the spindle, after it has been mounted on the cassette holder, is rotated about 30 turns in the winding direction of this spring, which is possible, for example, by rotating one of the two gear wheels manually or by means of a motor. When the cassette holder is moved from the loading position to the operating position the spindle together with the gear wheels make about 3 revolutions, which means that the pretension of the helical spring decreases only by approximately 10%.

It is obvious that the helical spring 56 must be pretensioned before the gear wheels 63 and 64 are meshed with the toothed portions 65 and 66, i.e. before the cassette holder 35 is mounted in the apparatus. As already stated, pretensioning is effected by rotating the spindle 58 in the winding direction of the helical spring, i.e. in the anti-clockwise direction viewed in FIG. 6.

After pretensioning of the helical spring 56 care must be taken that the spring cannot relax before the gear wheels 63 and 64 are in mesh with the toothed portions 65 and 66. As is shown on an enlarged scale in FIG. 6, the present apparatus comprises a latch 83 on the cassette holder 35, which latch is movable between a blocking position shown in FIG. 6 and a release position shown in FIGS. 3, 4 and 5 and is adapted to cooperate with a stop 82 on the spindle 58 to block rotation of the spindle 58 by the helical spring 56. The latch 83, which is integral with the cassette holder 35, comprises a lever which is arranged on the side wall 37 and which is pivotable in a direction parallel to said side wall about an integral hinge 84, the stop 82 being urged against the free end of the lever by the helical spring 56 in the blocking position of the latch and the latch 83 in its turn butting against a stop 85 which projects from the side wall 37. In its release position the latch 83 is situated outside the path of movement of the stop 82, so that the latch 83 liberates the stop 82. As is shown in FIG. 6, the free end of the latch 83 when this latch is in its blocking position engages in a tooth gap 86 of the gear wheel 64 on the spindle 58 and the stop 82 is formed by a tooth adjacent the tooth gap 86 of said gear wheel 64 and acts against the free end of the latch 83 under the influence of the helical spring 56.

After pretensioning of the helical spring 56 by rotating the gear wheel 64 in the winding direction of this spring, the latch 83 is set from its release position to its blocking position, for example manually or mechanically, in which blocking position it bears against the stop 85 and in which position it is retained under the influence of the helical spring. In this way the helical spring 56 cannot relax inadvertently. When the cassette holder 35 is mounted in the apparatus after the gear wheels 63 and 64 have been brought into mesh with the toothed portions 65 and 66 and the drive means 57 has been mounted, so that it is in position shown in FIG. 3, the lath 83 is set from its blocking position to its release position, for example manually, after which the latch is inoperative and the cassette holder is retained in its loading position by the drive means which atacts as a latching device.

The latch is a simple and dependable mounting aid which precludes an inadvertent rotation of the spindle and the gear wheels under the influence of the pretensioned helical spring when the gear wheels are not in mesh with the toothed portions. Since one of the teeth of a gear wheel is used as a stop which cooperates with the latch a simple construction is obtained, enabling the spindle to be latched in a plurality of positions corresponding to the number of teeth of the gear wheel.

It is obvious that several modifications are possible within the scope of the invention. For example, a cassette holder may be guided so as to be movable only in a direction perpendicular to its main walls. In the case of a cassette holder which is guided so as to be initially movable out of its loading position in a direction substantially parallel to its main walls at least a part of this actuating movement may comprise a small component in a direction perpendicular to the main walls of the cassette holder. A cassette holder may alternatively comprise two non-interconnected U-shaped cassette supports which are each guided in a guide plate, the walls corresponding to the interconnecting portion of the U forming the lateral walls of the cassette holder and the walls corresponding to the limbs of the U forming the main walls of the cassette holder.

A cassette holder may also be provided with, for example, two spindles around each of which at least one helical spring is arranged. Further, a spindle may carry only one gear wheel which is in mesh with a toothed portion and which is situated halfway between the two side walls of the cassette holder, whilst a helical spring may be arranged on the spindle on each side of said gear wheel. The end of a helical spring which acts on the spindle may also be offset from the turns of said spring in a direction parallel to the spindle and may be passed through a bore in a disk which is clamped onto the spindle. The latch which prevents the helical spring from being relaxed inadvertently may alternatively comprise a slide which is movably guided on the cassette holder.

In the apparatus described hereinbefore the latch may also be released automatically after the gear wheels have been brought into mesh with the toothed portions, namely in that the cassette holder is moved slightly towards the front wall of the apparatus, so that the gear wheels which mesh with the toothed portions are slightly rotated against the pretension of the helical spring, causing the latch to be driven and become disengaged from the teeth of a gear wheel and to be moved to and retained in its release position under the influence of the spring action of the integral hinge.

The present apparatus is an apparatus for cassettes containing a record carrier in the form of a tape. It is obvious that the steps in accordance with the invention may also be applied to apparatuses which are constructed to cooperate with cassettes containing a disk-shaped record carrier.

What is claimed is:

1. A recording and/or reproducing apparatus for a record carrier arranged in a cassette, comprising:
   a cassette holder which comprises at least one main wall and two side walls and which is guided so as to be movable between a first end position and a second end position in a direction parallel to its side walls along a path of movement which extends at least partly transversely to its main wall, one end position being a loading position; in the loading position said holder being arranged for receiving a cassette whose main walls extend parallel to the main wall of the cassette holder, said cassette being inserted into the cassette holder such that a main wall of the inserted cassette is positioned against the main wall of the holder; and the other end position being an operating position,
   a stop,
   at least one actuating spring acting on said holder to move it from the first end position to the second end position and to urge the holder against said stop when said holder is in the second end position, and
   a disengageable latching device for latching said holder in the first end position against the force of the actuating spring, characterized in that
   the apparatus comprises at least one spindle (58) which extends perpendicularly to the side walls (36, 37) of the cassette holder (35), is mounted for rotation on said holder, and carries at least one gear wheel (63, 64), and
   a toothed member (65, 66) having the same shape as the path of movement of the cassette holder, arranged such that said gear wheel meshes with said member, and
   the actuating spring (56) is a cylindrical helical spring which is wound around the spindle (58) with pretension, said spring having one end (59) which acts on the cassette holder (35), and another end (60) which acts on the spindle (58), and after the release of the latching device (57) drives the spindle (58) and said gear wheel (63, 64) on said spindle under the influence of its pretension, the gear wheel meshing with the toothed member (65, 66) to move the cassette holder (35) from the first end position into the second end position.

2. An apparatus as claimed in claim 1, characterized in that near each side wall (36, 37) of the cassette holder (35) said spindle (58), carries a respective one of said gear wheels (63, 64), each said gear wheel meshing with a respective toothed member (65, 66).

3. An apparatus as claimed in claim 2, characterized in that for blocking the spindle (58) against rotation by the pretensioned helical spring (56) said stop is disposed on said spindle; and
   said latching device comprises a latch (83) which is adapted to cooperate with said stop (82) and is movable between a blocking position and a release position, the stop (82) being urged against said latch by the pretension of the helical spring (56) when the latch is in its blocking position, and said latch being disengaged from the stop (82) when the latch is in its release position.

4. An apparatus as claimed in claim 3, characterized in that in its blocking position the latch (83) engages in a tooth gap (86) of said at least one gear wheel (64) on the spindle (58) and the stop (82) comprises the tooth which adjoins said tooth gap of said at least one gear wheel (64) and which is urged against the latch (83) by the pretension of the helical spring (56) (FIG. 6).

5. An apparatus as claimed in claim 1, characterized in that for blocking the spindle (58) against rotation by the pretensioned helical spring (56) said stop is disposed on said spindle; and
   said latching device comprises a latch (83) which is adapted to cooperate with said stop (82) and is movable between a blocking position and a release position, the stop (82) being urged against said latch by the pretension of the helical spring (56) when the latch is in its blocking position, and said latch being disengaged from the stop (82) when the latch is in its release position.

6. An apparatus as claimed in claim 5, characterized in that in its blocking position the latch (83) engages in a tooth gap (86) of said at least one gear wheel (64) on the spindle (58) and the stop (82) comprises the tooth which adjoins said tooth gap of said at least one gear wheel (64) and which is urged against the latch (83) by the pretension of the helical spring (56).

* * * * *